United States Patent
Carey et al.

(10) Patent No.: US 10,353,801 B2
(45) Date of Patent: *Jul. 16, 2019

(54) ABNORMAL TIMING BREAKPOINTS

(71) Applicant: INTERNATIONAL BUSINESS MACHINES CORPORATION, Armonk, NY (US)

(72) Inventors: James E. Carey, Rochester, MN (US); Jim C. Chen, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 312 days.

This patent is subject to a terminal disclaimer.

(21) Appl. No.: 15/444,604

(22) Filed: Feb. 28, 2017

(65) Prior Publication Data

US 2018/0246799 A1 Aug. 30, 2018

(51) Int. Cl.
  *G06F 9/44* (2018.01)
  *G06F 9/45* (2006.01)
  *G06F 9/445* (2018.01)
  *G06F 11/36* (2006.01)

(52) U.S. Cl.
  CPC ........ *G06F 11/362* (2013.01); *G06F 11/3612* (2013.01); *G06F 11/3664* (2013.01); *G06F 11/3656* (2013.01)

(58) Field of Classification Search
  CPC ............. G06F 11/3612; G06F 11/3664; G06F 11/3656; G06F 11/362–3656
  See application file for complete search history.

(56) References Cited

U.S. PATENT DOCUMENTS

| 5,297,248 A | 3/1994 | Clark |
| 6,587,995 B1 | 7/2003 | Duboc et al. |
| 7,047,519 B2 | 5/2006 | Bates |

(Continued)

OTHER PUBLICATIONS

Guido Salvaneschi, Debugging for Reactive Programming, 2016, pp. 796-805. https://ieeexplore.ieee.org/stamp/stamp.jsp?tp=arnumber=7886957 (Year: 2016).*

(Continued)

*Primary Examiner* — Mongbao Nguyen
(74) *Attorney, Agent, or Firm* — Dmirty Paskalov (57) ABSTRACT

Embodiments of the present invention provide a system, method, and program product for an abnormal timing breakpoints. A computer determines a code section, wherein the code section is part of computer code edited by a user. The computer determines an expected timeframe and an expected count for the code section, wherein the expected timeframe represents a predicted time to execute the code section, and wherein the expected execution count represent a predicted number of executions of the code section. The computer determines that an execution of the code section is abnormal based on one or more of: determining a current execution time is greater than the expected timeframe, and determining a current execution count is greater than the expected count. The computer halting the execution of the code section based on determining that the execution of the code section is abnormal and displays the abnormal code section.

6 Claims, 6 Drawing Sheets

(56) References Cited

U.S. PATENT DOCUMENTS

| | | | |
|---|---|---|---|
| 8,219,980 | B2 | 7/2012 | Bates et al. |
| 8,271,955 | B1* | 9/2012 | Lindahl ............... G06F 11/3656 714/45 |
| 8,312,434 | B2 | 11/2012 | Bates |
| 8,327,332 | B2 | 12/2012 | Sutanto et al. |
| 8,793,661 | B1* | 7/2014 | Fei ........................ G06F 11/362 717/126 |
| 8,839,206 | B2 | 9/2014 | Kalra |
| 9,430,194 | B1* | 8/2016 | Childs ....................... G06F 8/34 |
| 9,489,287 | B2 | 11/2016 | Hanssen |
| 2003/0066054 | A1 | 4/2003 | Aarts |
| 2003/0106045 | A1 | 6/2003 | Arnold |
| 2003/0108746 | A1 | 6/2003 | Choate et al. |
| 2006/0200807 | A1 | 9/2006 | Bates |
| 2007/0157174 | A1 | 7/2007 | Gebhardt et al. |
| 2011/0029817 | A1* | 2/2011 | Nakagawa .......... G06F 11/0709 714/37 |
| 2011/0145796 | A1* | 6/2011 | Trainin ................... G06F 9/526 717/127 |
| 2011/0321007 | A1* | 12/2011 | Marum ..................... G06F 8/65 717/113 |
| 2012/0110556 | A1 | 5/2012 | Bates |
| 2012/0222014 | A1* | 8/2012 | Peretz ................. G06F 11/3684 717/125 |
| 2013/0024837 | A1* | 1/2013 | Bienkowski ........ G06F 11/3664 717/109 |
| 2013/0024844 | A1* | 1/2013 | Bienkowski ........ G06F 11/3688 717/125 |
| 2014/0366006 | A1* | 12/2014 | Gottschlich ......... G06F 11/3664 717/125 |
| 2015/0052502 | A1* | 2/2015 | Faillaci, III ......... G06F 11/3636 717/125 |
| 2015/0234730 | A1 | 8/2015 | Puthuff et al. |
| 2015/0347274 | A1 | 12/2015 | Taylor |
| 2016/0092345 | A1 | 3/2016 | Branson |
| 2016/0103752 | A1 | 4/2016 | Bates |
| 2016/0124834 | A1 | 5/2016 | Davis |
| 2016/0179654 | A1* | 6/2016 | Cox ........................ G06F 11/34 717/127 |
| 2016/0259705 | A1 | 9/2016 | Barsness et al. |
| 2016/0321158 | A1 | 11/2016 | Bates et al. |
| 2016/0321159 | A1* | 11/2016 | Romm ................. G06F 11/364 |
| 2016/0328308 | A1 | 11/2016 | Pywell |

OTHER PUBLICATIONS

Bilal Alsallakh, Visual Tracing for the Eclipse Java Debugger, 2012, pp. 545-548. https://ieeexplore.ieee.org/stamp/stamp.jsp?tp=arnumber=6178940 (Year: 2012).*

Yan Wang, A State Alteration and Inspection-based Interactive Debugger, 2013, pp. 84-93. https://ieeexplore.ieee.org/stamp/stamp.jsp?tp=&arnumber=6648188 (Year: 2013)*

Muhammad Ali Gulzar, BigDebug: Debugging Primitives for Interactive Big Data Processing in Spark, 2016, pp. 784-793. https://ieeexplore.ieee.org/stamp/stamp.jsp?tp=&arnumber=7886956 (Year: 2016).*

Mirgorodskiy et al., "Autonomous analysis of interactive systems with self-propelled instrumentation", Computer Sciences Dept., Univ. of Wisconsin, Copyright 2004 Society of Photo-Optical Instrumentation Engineers, pp. 1-15.

Lieber et al., "Addressing Misconceptions About Code with Always-On Programming Visualization", Session: Programmming and Development Tools, CHI 2014, Apr. 26-May 1, 2014, Toronto, ON, Canada, pp. 2481-2490.

Mell et al., "The NIST Definition of Cloud Computing", National Institute of Standards and Technology, Special Publication 800-145, Recommendations of the National Institute of Standards and Technology, Sep. 2011, 7 pages.

IBM: List of IBM Patents or Patent Applications Treated as Related (Appendix P), Oct. 12, 2017, pp. 1-2.

Carey et al., U.S. Appl. No. 15/711,333, filed Sep. 21, 2017, titled "Abnormal Timing Breakpoints", pp. 1-26.

Microsoft, "Visual Studio 2015—Analyze performance while debugging in Visual Studio 2015", May 2015, pp. 1-16, https://msdn.microsoft.com/en-us/magazine/dn973013.aspx.

Green Hills Software, Inc., "MULTI: Debugging", Nov. 4, 2005, pp. 397-476, http://www.ece.ualberta.ca/-cmpe490/documents/ghs/debug.pdf.

Microsoft, "Navigate Code with the Visual Studio Debugger", Microsoft Docs, Feb. 7, 2017, pp. 1-8, https://docs.microsoft.com/en-us/visualstudio/debugger/navigating-th rough-code-with-the-debugger.

Yin et al., "A Pointcut Language for Setting Advanced Breakpoints", AOSD '13, Mar. 24-29, 2013, Fukuoka, Japan, pp. 145-156, https://dl.acm.org/citation.cfm?id=2451436.2451454.

* cited by examiner

FIG. 1

DISPLAY 922

COMPUTER CODE 222

```
18    private void button1_Click(object sender, EventArgs e)
19    {
20        int letterCount = 0;
21        string strText = "Debugging";
22        string letter;
23
24        for (int i = 0; i < strText.Length; i++)
25        {
26            letter = strText.Substring(i, 1);
27
28            if (letter == "g")
29            {
30                LetterCount++;
31            }
32        }
33
34        textBox1.Text = "g appears " + LetterCount + " times";
35    }
```

BREAKPOINT 220

INSTRUCTION 21

INSTRUCTION 26

ABNORMAL TIMING BREAKPOINTS

BACKGROUND

The present invention relates generally to a field of debugging computer code, and more particularly to breaking execution of computer code in a debugging mode after there is an abnormal behavior in the computer code execution.

Computer code is any collection of instructions, written on a computer using a human-readable programming language as ordinary text that can be transformed by an assembler or compiler into binary machine code to be executed by a computer.

Debugger is a software program that is used to test and debug computer code. Debugger can be a standalone software or an integrated part to an Integrated Development Environment (IDE) software. During debugging, the computer code is executed on an instruction set simulator (ISS), a technique that allows to halt the execution of the computer code when specific conditions are encountered.

One of the features of the debugger is a breakpoint. A breakpoint is a feature of the debugger that halts (pauses or breaks the execution of the computer code) and allows the user to examine the current state of computer code execution before a specified instruction of the computer code is executed, while allowing the user to track and change the values of variables.

SUMMARY

Embodiments of the present invention provide a system, method, and program product for an abnormal timing breakpoints. A computer determines a code section, wherein the code section is part of computer code edited by a user. The computer determines an expected execution timeframe and an expected execution count for the code section, wherein the expected timeframe represents a predicted time to execute the code section, and wherein the counts represent a predicted number of executions of the code section. The computer determines that an execution of the code section is abnormal based on one or more of: determining a current execution time is greater than the expected execution time, and determining a current execution count is greater than the expected execution count. The computer halting the execution of the code section based on determining that the execution of the code section is abnormal and displays the abnormal code section.

DETAILED DESCRIPTION

Breakpoint is a feature of a debugging software that allows a user to halt the execution of computer code in order to control instruction execution, inspect the variable values, and find and correct a mistake (bug) in the computer code. Typically, breakpoints are set by a user in computer code using a Graphic User Interface (GUI) of the debugger. The moment the debugger reaches any of the set breakpoints it halts the execution of the instructions and gives control to the user to examine the variable values in order to find the mistake in the computer code.

However, programming errors, such as an infinite loop, can cause the execution of the computer code to run indefinitely, and never reach the set breakpoint. This can lead to difficulties in discovering the source of the mistake in the computer code. An infinite loop mistake can be resolved by using an abnormal timing breakpoints program, which can determine abnormal computer code execution by detecting an abnormal timeframe for the execution of the computer code or its instructions on debugger 114.

Figure 1:
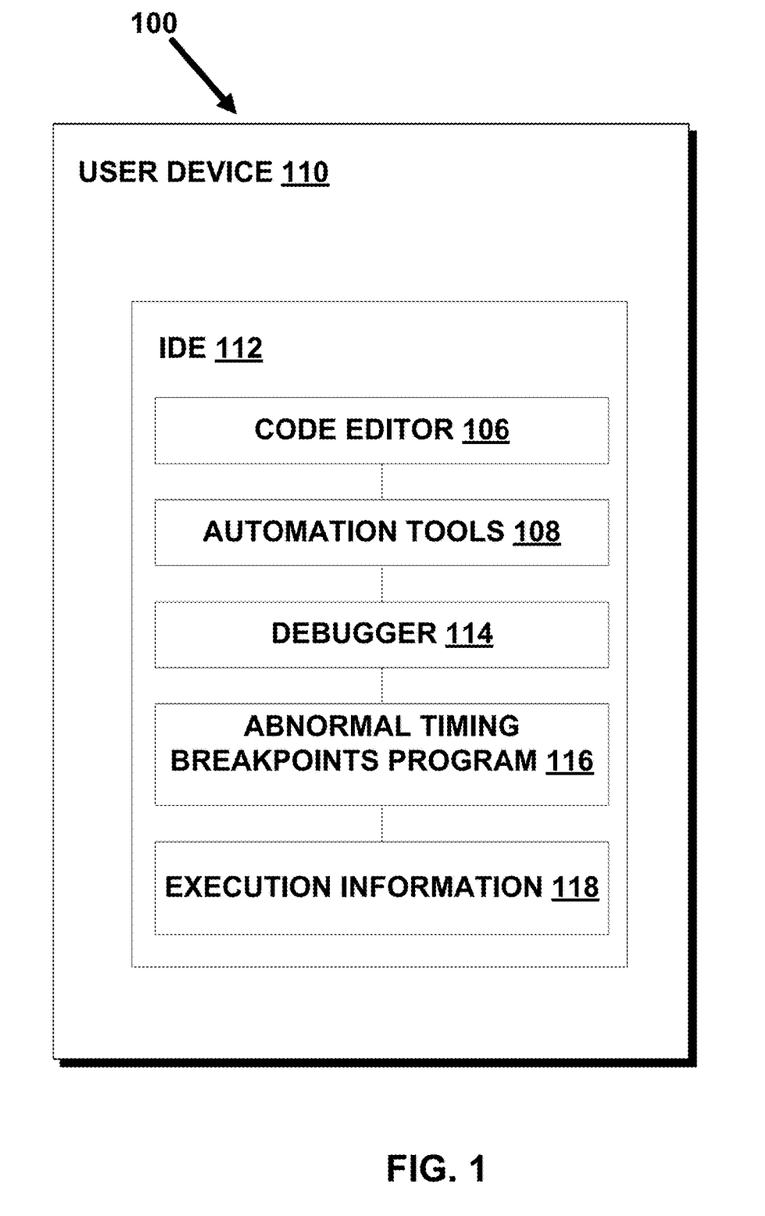
FIG. 1 illustrates a Debugging Timing Breakpoints system 100, in accordance with an embodiment of the invention.

FIG. 1 illustrates a Debugging Timing Breakpoints (DTB) system 100 that is configured to determine an abnormal behavior of computer code, such as computer code 222 (FIG. 2) that is being edited on debugger 114. In an example embodiment, DTB system 100 can include a user device 110 that is running IDE 112 software that incorporates debugger 114, Abnormal Timing Breakpoints (ATB) program 116 and execution information 118.

According to an example embodiment, user device 110 represents a computing platform configured to run software programs. For example, user device 110 can be a desktop computer, a notebook, a laptop computer, a tablet computer, a handheld device, a smart-phone, a thin client, or any other electronic device or computing system capable of running software programs such as an Integrated Development Environment (IDE) software with a debugger. In an example embodiment, user device 110 can run IDE 112 that includes a debugger 114, an ATB program 116 and execution information 118. In another embodiment, IDE 112 or debugger 114 can run on other device while user device 110 controls IDE 112 or debugger 114 software.

According to an example embodiment, IDE 112 is a software program that provides capabilities to a user (computer programmer) for efficient software development. IDE 112 can include a computer code editor, automation tools, and a debugger, such as debugger 114.

Code editor 106 can be a text editor program designed specifically for editing computer code of the computer program by the user. Code editor can be a standalone software program or it can be built into an integrated development environment, such as IDE 112.

Automation tools 108 are software programs separate from the computer code being tested, configured to control the execution of tests and the comparison of actual outcomes with predicted outcomes. For example, Graphical User Interface (GUI) automation tools 108 generates user interface events such as keystrokes and mouse clicks, and observes the changes that result in the GUI, to validate that the observable behavior of the computer code is correct.

Figure 2:
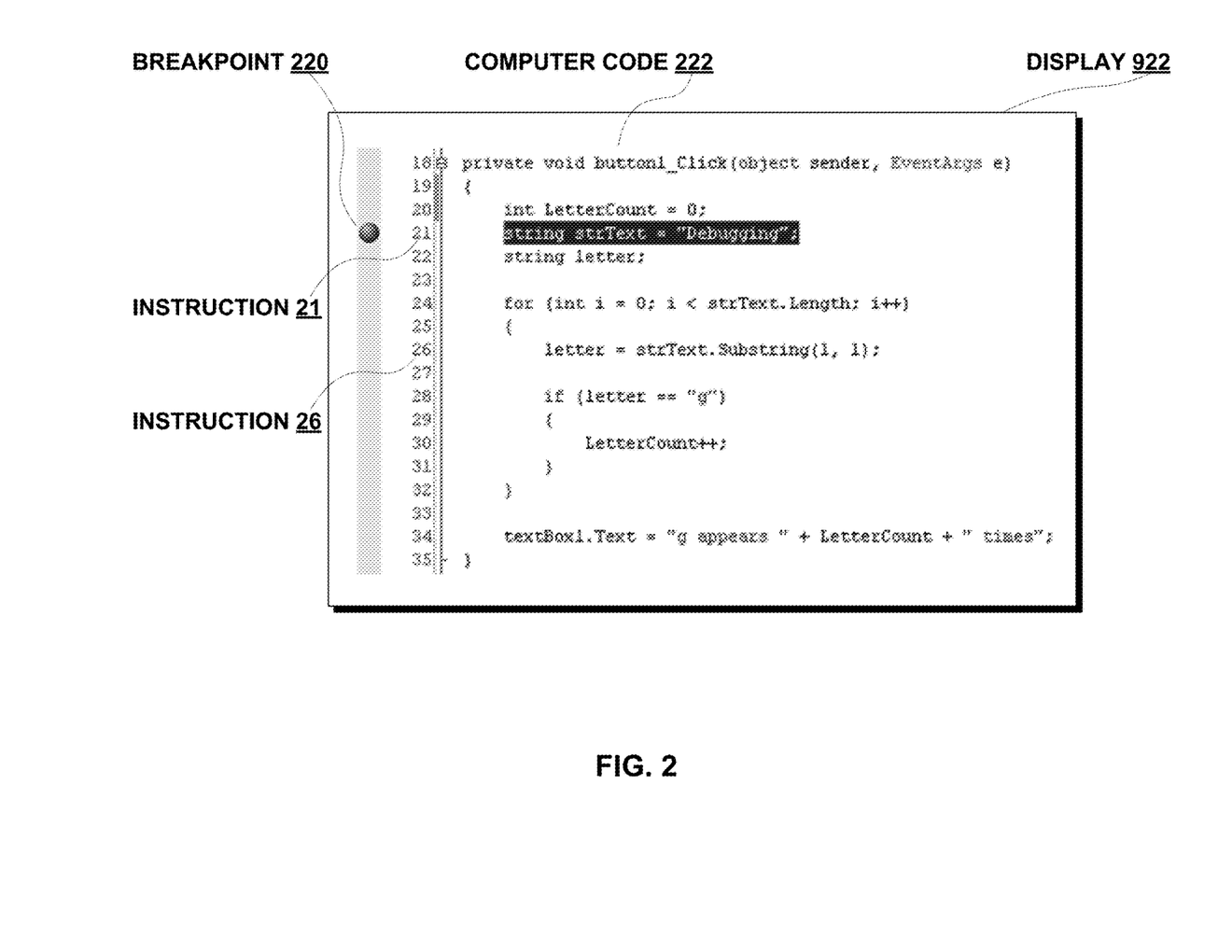
FIG. 2 is an illustration of a computer code, in accordance with an embodiment of the invention.

According to an example embodiment, debugger 114 is a software program that is configured to inspect and find mistakes in the computer code such as computer code 222. Typically, computer code is any collection of computer instructions, written using a human-readable programming language, as ordinary text that can be transformed by an assembler or compiler into binary machine code that can be executed by a computing device such as user device 110. Computer code 222 can also include metadata, such as breakpoint 220, which can assist in the debugging of the computer code 222.

In other instances, a breakpoint can be set by debugger 114 while certain conditions are met. One of the breakpoints that can be set by debugger 114 is an abnormal timing breakpoint that is implemented by ATB program 116.

Execution information 118 is a database configured to store computer code execution information. According to an example embodiment, ATB program 116 can store statistical information in execution information 118 that is related to the execution of computer code 222. Execution information 118 can include code execution information such as time and counts (a number of times the instruction was executed during one run of the computer code) for each instruction from computer code 222. In another embodiment, execution information 118, can have a reference table with average timeframes and counts for each instruction, loop, procedure, method or block of instructions 222 based on previous runs.

According to an example embodiment, ATB program 116 is a software program that can be integrated into debugger 114 as a method, procedure or as an Application Programming Interface (API) software. In an embodiment, ATB program 116 can be a stand-alone program that runs in the background and halts execution of the computer code when a specific conditions for the breakpoint occur. In further embodiment, ATB program 116 can be integrated into IDE 112 whenever debugger 114 is an integrated part of IDE 112. The operations of ATB program 116 are described in details below, with regard to FIG. 3.

FIG. 2 is an illustration of a computer code, in accordance with an embodiment of the invention. As previously described, computer code is any collection of computer instructions (i.e. instruction 21), as ordinary text that can be transformed by an assembler or compiler into binary machine code that can be executed by a computing device such as user device 110. Computer code 222 can also include metadata, such as breakpoint 220, which can assist in the debugging of the computer code 222.

According to an example embodiment, breakpoint 220 can be a feature of debugging software such as debugger 114. Breakpoint 220 can allow the user to halt the execution of computer code 222 at a specific instruction, such as instruction 21. Breakpoint 220 can consist of a function and a GUI element representing the function. For example, breakpoint 220 can be set using a GUI of debugger 114 with an input device such as a keyboard or a mouse. Typically, setting the breakpoint on a specific instruction is visually displayed as an indicated instruction by a GUI object of debugger 114, as breakpoint 220. For example, if computer code 222 is executed on debugger 114, the execution of a computer program is halted at breakpoint 220 before instruction 21 is executed and the user can inspect the variables and find and correct a mistake in computer code 222, in the middle of computer code 222 execution.

Figure 3:
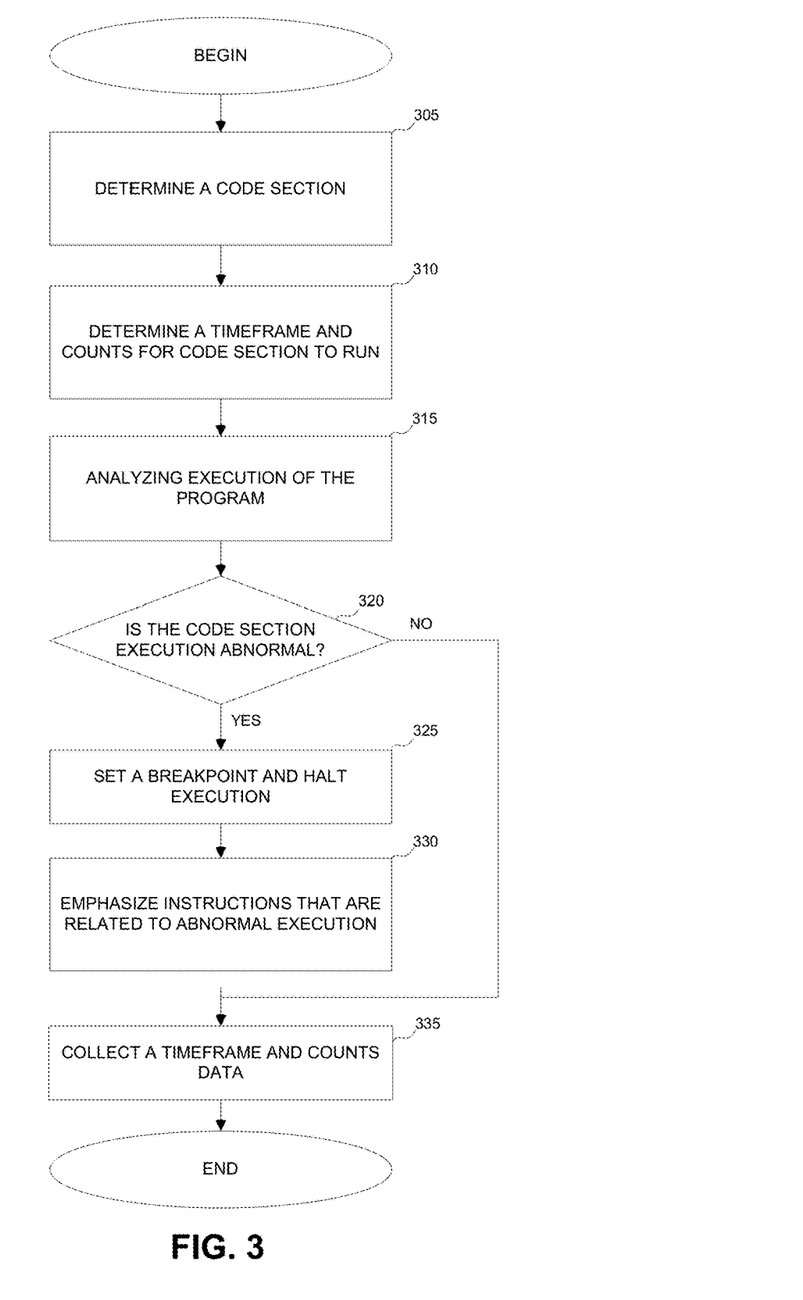
FIG. 3 is a flowchart illustrating operations of an Abnormal Timing Breakpoints program of FIG. 1, in accordance with an embodiment of the invention.

FIG. 3 is a flowchart illustrating the operations of ATB program 116, in accordance with an embodiment of the invention. Referring to step 305, ATB program 116 determines a code section. According to an example embodiment, a code section can be computer code 222 that is edited by debugger 114. In another embodiment, a user can specify a part of edited computer code as a code section. In further embodiment, ATB program 116 can determine the code section by selecting the instructions that can be potentially involved in an infinite loop, such as linked files, APIs and external libraries. An infinite loop is a sequence of instructions in computer code which loops endlessly, either due to the loop having no terminating condition, having one that can never be met, or one that causes the loop to start over. Infinite loops can be, for example, count-controlled loops ("for" loops), condition-controlled loops ("while" or "do while" loops), recursive functions, or any instructions that are altering the flow of the computer code.

Referring to step 310, ATB program 116 determines a timeframe and counts for a code section to run. According to an example embodiment, ATB program 116, accesses execution information 118 and determines the expected timeframe and the expected count for the code section to run based on previous executions data that is stored in execution information 118. For example, if the code section selected by a user is only a part of computer code 222, then the expected timeframe it should take to execute the code section can be determined by multiplying a count of instructions from the code section by average timeframe it took to execute the instruction during previous execution based on the data from execution information 118. In a further embodiment, ATB program 116 can analyze the selected code and infer the expected timeframe or the expected count for each instruction of the computer code. For example, if the code section has a loop that has a loop controlling variable as a counter and the loop is designed to end when the loop controlling variable value reaches a specific value, ATB program 116 will set its expected count to that value or calculate an expected timeframe based on multiplying the specific value by a previous execution timeframe it takes to execute the instructions during previous executions. In further embodiment, a user can specify the expected timeframe or the expected count for either the selected computer code, instruction or a loop in the computer code using a GUI.

Referring to step 315, ATB program 116 analyzes execution of the computer code 222. According to an example embodiment, the execution of computer code 222 is performed by debugger 114 while ATB program 116 controls and collects data from debugger 114 while running in the background. The collected data can include a duration of time it takes for each instruction to be executed by debugger 114, and counts times each instruction was executed during the computer code execution. For example, ATB program 116 can analyze and collect data that includes calculating the timeframe and counts and comparing the data to execution information 118 after each instruction is executed during current execution of computer code 222.

Referring to decision 320, ATB program 116 determines whether the execution of a code section is abnormal. Abnormal execution can occur when the current execution time or current execution count for any instruction, loop or code section exceeds a previously determined expected execution timeframe or expected execution count. In another embodiment, a user can pre-determine a threshold value that if the current execution time or current execution count exceeds the predetermined threshold value the execution is abnormal. If the execution is abnormal (decision 320, "Yes" branch), ATB program 116 proceeds to step 325. If the timeframe or counts for instruction, loop or code section does not exceed previously determined timeframe and counts, execution is not abnormal (decision 320, "No" branch) and ATB program 116 proceeds to step 335. According to an example embodiment, the determination whether the execution of a code section is abnormal is determined by comparing pre-determined or previously stored data of timeframes and counts for each instruction from execution information 118 to a current execution time and counts of each instruction during execution of the code section.

Referring to step 325, ATB program 116 sets a breakpoint and halts current execution. According to an example embodiment, ATB program 116 sets a breakpoint on an instruction that had an abnormal execution and halts the current execution of the code section. According to an example embodiment, ATB program 116 can visually indicate the instruction that has abnormal current execution time or current execution count using GUI object representing the breakpoint, such as breakpoint 220. For example, if instruction 21 was determined to have a count of 10, prior of the current execution of the $11^{th}$ count of instruction 21, ATB program 116 will halt the current execution of the code section. Following a halt of the computer code current execution, ATB program 116 can indicate instruction 21 using GUI object representing breakpoint 220.

Referring to step 330, ATB program 116 indicates the instructions that are related to abnormal execution. According to an example embodiment, ATB program 116 can display the instruction that triggered the abnormal execution using GUI components of debugger 114 such as, for example, by setting breakpoint 220 on the abnormal instruction. In another embodiment, a user defined threshold value such as timeframe threshold value or count threshold value can be used to visually indicate instructions that get closer to abnormal execution. In further embodiment, a parameter can be determined by combining timeframe threshold value with a count threshold value. For example, one or more instructions can be displayed with highlighted effects where the highlighting color can gradually change when the instructions were repeated above the user defined threshold value but still have not reached the abnormal timeframe or count.

In an example case, ATB program 116 halts the execution of computer code 222 due to an abnormal execution. In the example case, instruction 21 had the abnormal execution (current execution timeframe or count exceeded expected execution timeframe or count), ATB program 116 sets a breakpoint on instruction 21, halts current execution of the code section, and displays the abnormal execution code. If the user defined threshold values for expected execution timeframe or count of a specific instruction, for example, an expected execution count threshold value of 7, ATB program 116 displaying the instruction by highlighting instruction 26 if the current execution count is above 7. In another embodiments, ATB program 116 can indicate instructions that have a timeframe value or count value above a threshold value using other visual features such as gradually increasing font, changing font color, underlining of the one or more instructions, or otherwise, based on a difference between the current execution time or count and the associated threshold value.

Referring to step 335, ATB program 116 collects the timeframe and count data. According to an example embodiment, ATB program 116 can collect runtime data of the instructions during code section execution that includes storing timeframes and counts it took for each instruction to execute, and stores the data in execution information 118 for future debugging of the code. According to an example embodiment, ATB program 116 can use the stored data to determine the timeframe and counts for each instruction to run. In another embodiment, a user can define a timeframe and count for each instruction and ATB program 116 can use these parameters for abnormal execution determinations.

Figure 4:
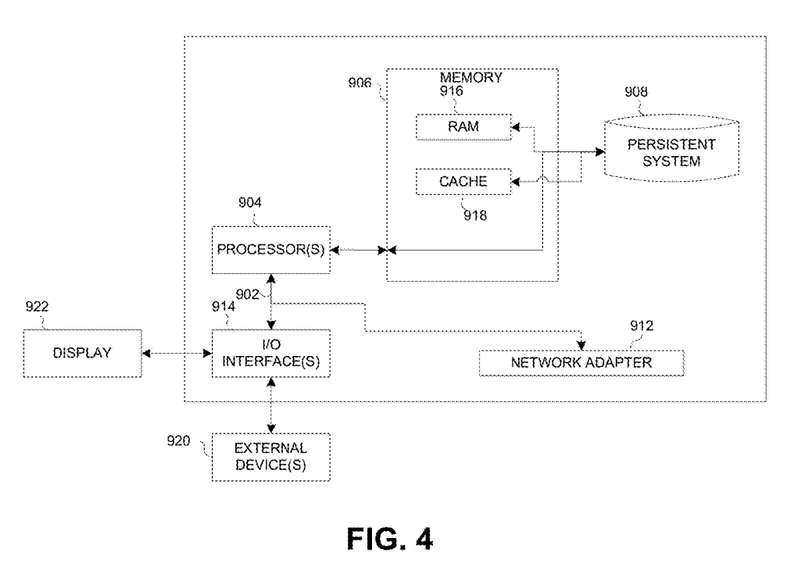
FIG. 4 is a block diagram depicting the hardware components of the Debugging Timing Breakpoints system 100 of FIG. 1, in accordance with an embodiment of the invention.

FIG. 4 depicts a block diagram of components of user device 110, in accordance with an illustrative embodiment of the present invention. It should be appreciated that FIG. 4 provides only an illustration of one implementation and does not imply any limitations with regard to the environments in which different embodiments can be implemented. Many modifications to the depicted environment can be made.

A user device 110 includes communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The ATB program 116 is stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 908 can also be removable. For example, a removable hard drive can be used for persistent storage 908. Other examples include optical and magnetic disks, thumb drives, and smart cards that are inserted into a drive for transfer onto another computer-readable storage medium that is part of persistent storage 908.

Communications unit 912, in these examples, provides for communications with other data processing systems or devices. In these examples, communications unit 912 includes one or more network interface cards. Communications unit 912 can provide communications using one or both of physical and wireless communications links. The ATB program 116 can be downloaded to persistent storage 908 through communications unit 912.

I/O interface(s) 914 allows for input and output of data with other devices that can be connected to user device 110. For example, I/O interface 914 can provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., ATB program 116 can be stored on such portable computer-readable storage media and can be loaded onto persistent storage 908 via I/O interface(s) 914. I/O interface(s) 914 can also connect to a display 922.

Display 922 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
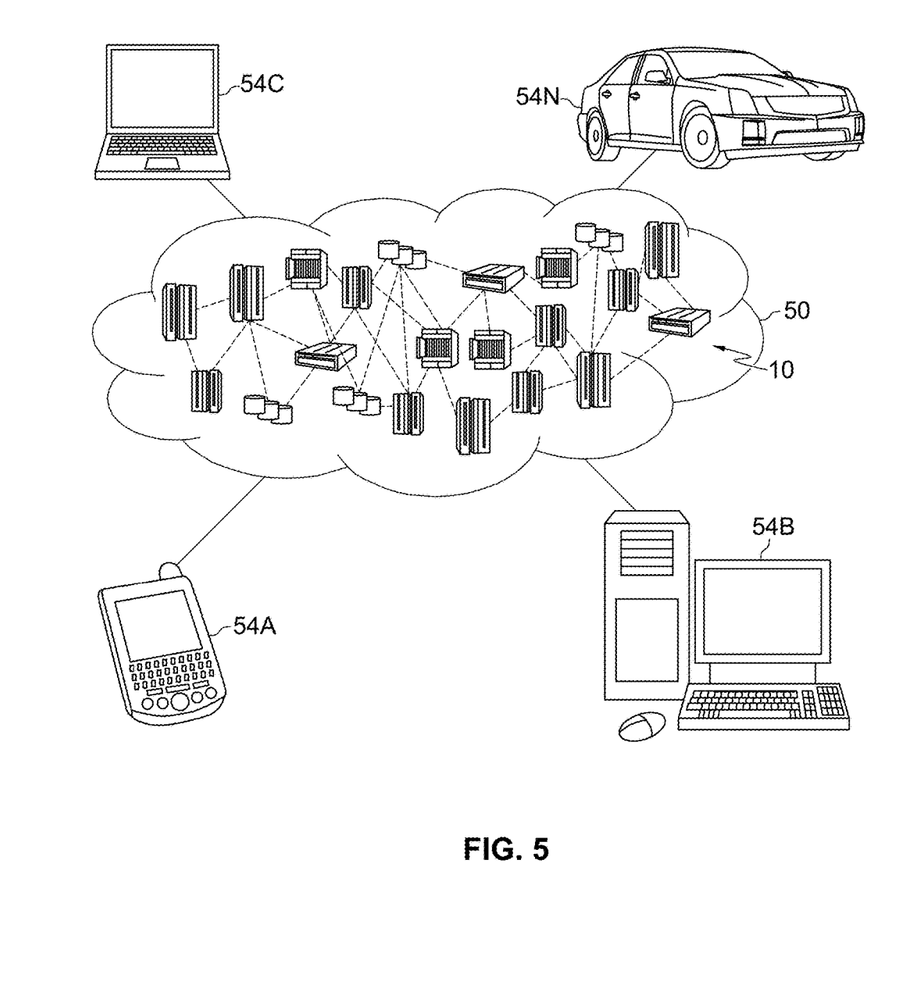
FIG. 5 depicts a cloud computing environment, in accordance with an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
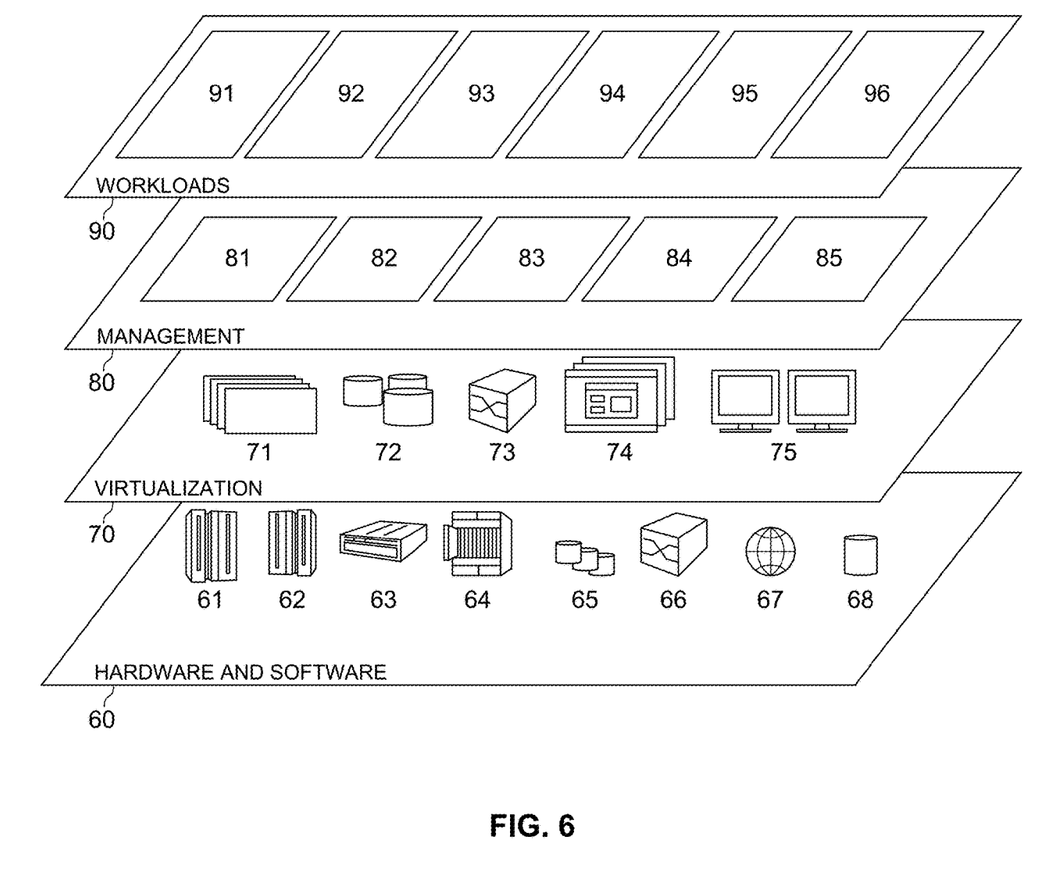
FIG. 6 depicts abstraction model layers, in accordance with an embodiment of the invention.

Referring now to FIG. 6, a set of functional abstraction layers provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and abnormal timing breakpoints processing 96. Abnormal timing breakpoints processing 96 can relate to functionality that analyzes the computer code for abnormal timing and counts during the computer code execution, halts the execution of the computer code whenever abnormal execution occurs, and displays the instructions that are related to the abnormal execution of the computer code.

What is claimed is:

1. A method being executed on a processor for an abnormal timing breakpoint execution to discover a source of a mistake in a computer code using a Graphic User Interface (GUI) of a debugger, the method comprising:
    determining, using the GUI of the debugger, a code section, wherein the code section is part of the computer code;
    determining an expected execution timeframe and an expected execution count for the code section based on collected data from previous runs of the computer code on the debugger, wherein the expected execution timeframe represents a predicted time to execute the code section, and wherein the expected execution count represent a predicted number of executions of the code section;
        wherein determining the expected execution timeframe and the expected execution count for the code section further comprises:
        analyzing the code section for a loop controlling variable value; and
        determining the expected execution timeframe and the expected execution count based on the loop controlling variable;
    determining, during runtime, that an execution of the code section is abnormal based on one or more of: determining a current execution time is greater than the expected execution timeframe, and determining a current execution count is greater than the expected execution count;
    based on determining that the execution of the code section is abnormal, halting the execution of the code section;
    determining that a parameter of the code section is above a threshold value based on one or more of: determining the current execution time is greater than a timeframe threshold value, and determining the current execution count is greater than a count threshold value, wherein the parameter is determined by combining a difference between the current execution time and the timeframe threshold value and a difference between the current execution count and the count threshold value;
    displaying, using the GUI of the debugger, the abnormal code section, wherein displaying the code section based on the parameter further comprises:
    changing, using the GUI of the debugger, a displayed highlighted color of one or more instructions from the code section based on a timeframe value determined from a difference between the current execution time and the timeframe threshold value; and
    changing the displayed highlighted color of the one or more instructions from the code section based on a count value determined from a difference between the current execution count and the count threshold value using the GUI of the debugger.

2. The method of claim 1 wherein determining the expected execution timeframe and the expected execution count further comprises:
    determining the expected execution count based on the loop controlling variable value; and
    calculating the expected execution timeframe based on multiplying the expected execution count by a previous execution timeframe from a previous execution of the code section.

3. A computer program product for an abnormal timing breakpoint execution to discover a source of a mistake in a computer code using a Graphic User Interface (GUI) of a debugger, the computer program product comprising:
    one or more computer-readable storage devices and program instructions stored on at least one of the one or more tangible storage devices, the program instructions comprising:
        program instructions to determine, using the GUI of the debugger, a code section, wherein the code section is part of the computer code;
        program instructions to determine an expected execution timeframe and an expected execution count for the code section based on collected data from previous runs of the computer code on the debugger, wherein the expected execution timeframe represents a predicted time to execute the code section, and wherein the expected execution count represent a predicted number of executions of the code section;
        wherein program instructions to determine the expected execution timeframe and the expected execution count for the code section further comprises:
        program instructions to analyze the code section for a loop controlling variable value; and
        program instructions to determine the expected execution timeframe and the expected execution count based on the loop controlling variable;
        program instructions to determine, during runtime, that an execution of the code section is abnormal based on one or more of: determining a current execution time is greater than the expected execution time, and determining a current execution count is greater than the expected execution count;

based on determining that the execution of the code section is abnormal, program instructions to halt the execution of the code section;

program instructions to determine that a parameter of the code section is above a threshold value based on one or more of: determining the current execution time is greater than a timeframe threshold value, and determining the current execution count is greater than a count threshold value, wherein the parameter is determined by combining a difference between the current execution time and the timeframe threshold value and a difference between the current execution count and the count threshold value; and program instructions to display, using the GUI of the debugger, the abnormal code section, wherein program instructions to display the code section based on the parameter further comprises:

program instructions to change, using the GUI of the debugger, a displayed highlighted color of one or more instructions from the code section based on a timeframe value determined from a difference between the current execution time and the expected execution timeframe; and program instructions to change the displayed highlighted color of the one or more instructions from the code section based on a count value determined from a difference between the current execution count and the count threshold value using the GUI of the debugger.

4. The computer program product of claim 3 wherein program instructions to determine the expected execution timeframe and the expected execution count further comprises:

program instructions to determine the expected execution count based on the loop controlling variable value; and program instructions to calculate the expected execution timeframe based on multiplying the expected execution count by a previous execution timeframe from a previous execution of the code section.

5. A computer system for an abnormal timing breakpoint execution to discover a source of a mistake in a computer code using a Graphic User Interface (GUI) of a debugger, the computer system comprising:

one or more processors, one or more memories, one or more computer-readable tangible storage devices, and program instructions stored on at least one of the one or more computer-readable tangible storage devices for execution by at least one of the one or more processors via at least one of the one or more memories, the program instructions comprising:

program instructions to determine, using the GUI of the debugger, a code section, wherein the code section is part of the computer code;

program instructions to determine an expected execution timeframe and an expected execution count for the code section, wherein the expected execution timeframe represents a predicted time to execute the code section, and wherein the expected execution count represent a predicted number of executions of the code section;

wherein program instructions to determine the expected execution timeframe and the expected execution count for the code section further comprises:

program instructions to analyze the code section for a loop controlling variable value; and program instructions to determine the expected execution timeframe and the expected execution count based on the loop controlling variable;

program instructions to determine, during runtime, that an execution of the code section is abnormal based on one or more of: determining a current execution time is greater than the expected execution time, and determining a current execution count is greater than the expected execution count;

based on determining that the execution of the code section is abnormal, program instructions to halt the execution of the code section;

program instructions to determine that a parameter of the code section is above a threshold value based on one or more of: determining the current execution time is greater than a timeframe threshold value, and determining the current execution count is greater than a count threshold value, wherein the parameter is determined by combining a difference between the current execution time and the timeframe threshold value and a difference between the current execution count and the count threshold value; and program instructions to display, using the GUI of the debugger, the abnormal code section, wherein program instructions to display the code section based on the parameter further comprises:

program instructions to change, using the GUI of the debugger, a displayed highlighted color of one or more instructions from the code section based on a timeframe value determined from a difference between the current execution time and the expected execution timeframe; and program instructions to change the displayed highlighted color of the one or more instructions from the code section based on a count value determined from a difference between the current execution count and the count threshold value using the GUI of the debugger.

6. The computer system of claim 5 wherein program instructions to determine the expected execution timeframe and the expected execution count further comprises:

program instructions to determine the expected execution count based on the loop controlling variable value; and program instructions to calculate the expected execution timeframe based on multiplying the expected execution count by a previous execution timeframe from a previous execution of the code section.

* * * * *